United States Patent [19]

Modell

[11] 4,061,566
[45] Dec. 6, 1977

[54] PROCESS USING A SUPERCRITICAL FLUID FOR REGENERATING SYNTHETIC ORGANIC POLYMERIC ADSORBENTS AND WASTEWATER TREATMENT EMBODYING THE SAME

[75] Inventor: Michael Modell, Cambridge, Mass.

[73] Assignee: Arthur D. Little, Inc., Cambridge, Mass.

[21] Appl. No.: 677,387

[22] Filed: Apr. 15, 1976

Related U.S. Application Data

[63] Continuation-in-part of Ser. No. 512,124, Oct. 4, 1974.

[51] Int. Cl.$^2$ .......................... B01D 15/06; B01J 1/09; B01J 31/40
[52] U.S. Cl. ........................................ 210/32; 210/34; 210/40; 252/411 R; 210/186; 210/269
[58] Field of Search .................... 252/411 R, 412, 414, 252/415; 210/24, 30, 32, 39, 40; 260/627 R; 208/263; 55/74, 75

[56] References Cited

U.S. PATENT DOCUMENTS

| | | | |
|---|---|---|---|
| 3,325,971 | 6/1967 | Rosman | 55/62 |
| 3,492,223 | 1/1970 | Walles | 210/24 R |
| 3,843,824 | 10/1974 | Roselius et al. | 426/386 |
| 3,923,847 | 12/1975 | Roselius et al. | 260/412.8 |
| 3,939,281 | 2/1976 | Schwengers | 426/430 |
| 3,969,196 | 7/1976 | Zosel | 203/49 |
| 3,979,287 | 9/1976 | Vulliez-Serment et al. | 208/263 |

*Primary Examiner*—Winston A. Douglas
*Assistant Examiner*—P. E. Konopka
*Attorney, Agent, or Firm*—Bessie A. Lepper

[57] ABSTRACT

An adsorbate is removed from a polymeric adsorbent by contacting the adsorbent with a supercritical fluid which is a solvent for the adsorbate. The supercritical fluid containing the dissolved adsorbate is then subjected to a physical treatment which renders the supercritical fluid a nonsolvent for the adsorbate and makes it possible to remove the adsorbate from the supercritical fluid. The supercritical fluid is then subjected to another physical treatment to restore it to a state wherein it is a solvent for the adsorbate so that it may be reused. The process is particularly suitable for adsorbent regeneration in the treatment of wastewaters.

24 Claims, 6 Drawing Figures

PROCESS USING A SUPERCRITICAL FLUID FOR REGENERATING SYNTHETIC ORGANIC POLYMERIC ADSORBENTS AND WASTEWATER TREATMENT EMBODYING THE SAME

This application is a continuation-in-part of my application Ser. No. 512,124 filed Oct. 4, 1974.

This invention relates to the regeneration of adsorbents and more particularly to a process for desorbing adsorbates from polymeric adsorbents by dissolving the adsorbate in an inert solvent maintained in a supercritical condition.

In the purification and removal of impurities from fluid streams in many industrial processes an adsorbent is used to adsorb the impurities from the fluid stream. Adsorbents may also be used to separate components in a process and to isolate trace impurities for quantitative analysis.

Thus, for example, small amounts of organics, both aliphatic and aromatic, have been removed by being adsorbed on activated carbon in the treatment of wastewaters from industrial processes. Color bodies are adsorbed in the process of sugar refining and impurities are removed from vinyl chloride streams through adsorption. In petroleum cracking processes the high surface area catalytic materials such as alumina, silica or like materials, with or without such metals as nickel, cobalt, molybdenum or tungsten deposited thereon, become contaminated by impurities which are adsorbed on them and, in some cases, chemically reacted. In all such cases, the adsorbates must be periodically removed from the adsorbents.

A number of inorganic adsorbents have been well known for some time and they may generally be defined as solid phase inorganic materials having very high surface area-to-weight ratios and exhibiting the ability to concentrate adsorbates on their surfaces. Among the more commonly used inorganic adsorbents are activated carbon, alumina, silica, and silicates.

The use of such organic adsorbents has normally included one or more steps to effect their regeneration, i.e., the removal of all or a part of the adsorbate which has adhered to the surface of the adsorbent. If the adsorbate is a volatile material, such regeneration may be accomplished by heating the adsorbent to volatilize off the adsorbate or by creating a vacuum around the adsorbent. Volatilization with heating may be accompanied by reaction with some added reactant, e.g., oxygen to oxidize adsorbed organic materials. It is, of course, apparent that the less volatile adsorbates require higher temperatures to remove them in this manner and such temperatures may contribute to the gradual thermal degradation of the adsorbent. Moreover, any reactant added, such as oxygen, may chemically degrade such an adsorbent as activated carbon, causing loss of usable capacity. Such losses require that the adsorbent be periodically replaced. Since the average lifetime of activated carbon is 10 to 30 regenerations, the loss necessitated by adsorbent replacement becomes a significant fraction of the total operating cost. The use of a vacuum to remove adsorbates from an adsorbent requires the equipment necessary to generate the required degree of evacuation and it is a technique which is limited to only certain classes of adsorbates, namely those which exhibit appreciable vapor pressure at temperatures below their decomposition point. That is, many low volatility solids and liquids will decompose before their vapor pressure becomes appreciable. Finally, the use of high temperatures for adsorbent regeneration requires a relatively high expenditure of energy.

Although activated carbon, as well as various inorganic adsorbents are still widely used for many purposes, the development of synthetic polymeric adsorbents in recent years has extended the use of adsorbents in industrial processes to a much wider range of applications than heretofore associated with activated carbon. In some instances, polymeric adsorbents have replaced activated carbon, silica, alumina and the like. One of the primary reasons for the rapidly expanding use of polymeric adsorbents lies in the fact that liquids may be used to remove the adsorbate from the polymeric adsorbent through the mechanism of solvation or reaction. Since this liquid removal is normally carried out under ambient conditions, many of the disadvantages inherent in the regeneration of activated carbon, for example, can be eliminated.

In regenerating the polymeric adsorbents, an organic solvent such as methanol or isopropanol may be used. If the adsorbate is a weak acid, a base may be used to react with it to remove it; and, if the adsorbate is a weak base, an acid may be used as a reactant. Finally, where adsorption is from an ionic solution water may be used; and, where the adsorbate is a volatile material, hot water or steam may be used.

By far, the most widely used technique for polymeric adsorbent regeneration is solvent extraction. After loading the adsorbate to the breakthrough point with the adsorbed species, an appropriate organic solvent is passed through the polymeric adsorbent bed to dissolve and extract the adsorbate. The cost of solvents used for the regeneration of the polymeric adsorbates requires that a high percentage of the solvent be recovered. Moreover, many such solvents, whether in bulk or in small quantities, cannot be disposed of without raising serious pollution problems. In recovering and purifying such solvents for reuse, operational factors are encountered which add considerably to the cost of such recovery.

In solvent regeneration the solvent is used to displace water (or other liquid from which the impurity is removed) from the adsorbate bed. This means that a solvent-water mixture is obtained which must be separated in the solvent recovery process. Since some of the more common and inexpensive solvents which are most effective for the regeneration of the polymeric adsorbents form azeotropes with water, such azeotropes must be dealt with in solvent recovery. In the distillation of a mixture which forms an azeotrope one column is used to recover one component and the azeotrope. The azeotrope must then be sent to a second column operating at either higher or lower pressures in order to recover the other component in a purified form. Each of such columns requires a large number of theoretical plates. It is therefore apparent that although the use of a solvent for the adsorbed species in the regeneration of a polymeric adsorbent involves no new art, it presents a serious economic problem. Indeed, the severity of the solvent recovery problem often rules out the use of synthetic polymeric resin adsorption unless the unpurified regenerating-solvent stream can be recycled or otherwise used economically in a contiguous process.

It would therefore be desirable to have a process by which adsorbates can effectively be removed or extracted from polymeric adsorbents efficiently and in which the solvent can be purified for recycling more economically than presently possible.

It is therefore a primary object of this invention to provide an improved process for regenerating polymeric adsorbents. It is another object to provide a process of the character described based on the dissolution of adsorbates which makes possible the efficient and economical recovery of the solvent used and, if desired, of the adsorbate. Still another object is to provide such a process which is applicable to a wide range of polymeric adsorbent-adsorbate combinations. A still further object is to provide a process of the character described in which inevitable solvent losses do not contribute additional pollution problems.

Another principal object of this invention is to provide improved process and apparatus for wastewater purification using a polymeric adsorbent to remove organic impurities and an inert solvent in the form of a supercritical fluid to desorb adsorbates from the absorbent to regenerate it.

Other objects of the invention will in part be obvious and will in part be apparent hereinafter.

In the process of this invention polymeric adsorbents are regenerated by desorbing adsorbates from them by dissolving the adsorbates in a chemically inert solvent in the form of a supercritical fluid. The adsorbent, with the adsorbate adhered thereto, is contacted with a suitable supercritical fluid and then the supercritical fluid containing the dissolved adsorbate is subjected to a physical treatment which renders it a nonsolvent for at least a portion of the adsorbate, thus separating the adsorbate and the supercritical fluid into two phases. Subsequent to the separation of the adsorbate from the supercritical fluid, the supercritical fluid, which may be described as being in a nonsolvent state, is subjected to another physical treatment to return it to the condition in which it is a solvent for the adsorbate so that it may be recycled. Thus it may be said to be in a solvent state prior to recycling. The physical treatments may constitute either altering the temperature, the pressure or both of the supercritical fluid. As an optional step, the adsorbate may be reacted with a reactant while dissolved in or mixed with the supercritical fluid.

In the following detailed discussion the term "nonsolvent state" is applied to the supercritical fluid to indicate that it has a relatively low solubility for one or more adsorbates; and the term "solvent state" is applied to the supercritical fluid to indicate that it has a relatively high solubility for one or more adsorbates. Thus these terms are not used in the absolute sense, but in the relative sense.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference should be had to the following detailed description taken in connection with the accompanying drawings in which.

The commercially available polymeric adsorbents may be described as hard, insoluble, high surface area, porous polymers. Typically, they are provided in spherical form with a nominal mesh size of about 16 to 50. They are available in a variety of polarities and surface characteristics thus making it possible to use them as adsorbents in a wide range of applications. For example, the polymeric adsorbents may be polymers of styrene, copolymers of styrene and divinylbenzene, or polymers containing acrylic esters, trimethylolpropane trimethacrylate or trimethylolpropane dimethacrylate. (See for example R. M. Simpson, "The Separation of Organic Chemicals from Water" presented at the Third Symposium of the Institute of Advanced Sanitation Research, International on Apr. 13, 1972, wherein exemplary chemical structures for polymeric adsorbents are given. See also German Offenlegungsschrift 1,943,807).

The polymeric adsorbents have found many varied applications in wastewater treatments. For example, they have been used to decolorize kraft pulp mill bleaching effluent and dye wastes and to remove pesticides from waste streams, alkylbenzene sulfonate or linear alkyl sulfonate-type surfactants from wastewaters and explosives such as TNT and DNT from effluent streams. These polymeric adsorbents have also been used in analysis procedures for determining trace amounts (as little as parts ber billion) of organic contaminants in water, in chemical processing and in isolating enzymes and proteins as well as other biological materials such as Vitamin B-12, tetracycline, oxytetracycline and oleandomycin.

Exemplary of the pesticides which can be removed by adsorption on a polymeric adsorbent from a waste stream are Lindane, DDT and Malathion and pesticides ingredients such as endrin, heptachlor and other chlorinated hydrocarbon intermediates.

Exemplary of the organics which may be removed from a water stream using polymeric adsorbents are those listed in Table 1 as reported by Junk et al, *Journal of Chromatography*, 99 745–762 (1974). The resins used were two different polystyrenes characterized as having 42% and 51% helium porosity, surface areas of 330 and 750 m²/gram, average pore diameters of 90 and 50 A, skeletal densities of 1.08 and 1.09 grams/cc, (respectively) and nominal mesh size of 20 to 50. (Sold as XAD-2 and XAD-4 by Rohm and Haas Company).

Table 1

| Organics Removable From A Water Stream By Adsorption on Polymeric Adsorbents |
|---|
| Alcohols |
| Hexyl |
| 2-Ethylhexanol |
| 2-Octanol |
| Decyl |
| Dodecyl |
| Benzyl |
| Cinnamyl |
| 2-Phenoxyethanol |
| Aldehydes and ketones |
| 2,6-Dimethyl-4-heptanone |
| 2-Undecanone |
| Acetophenone |
| Benzophenone |
| Benzil |

Table 1-continued

Organics Removable From A Water Stream
By Adsorption on Polymeric Adsorbents

Benzaldehyde
Salicylaldehyde

Esters

Benzyl acetate
Dimethoxyethyl phthalate
Dimethyl phthalate
Diethyl phthalate
Dibutyl phthalate
Di-2-ethylhexyl phthalate
Diethyl fumarate
Dibutyl fumarate
Di-2-ethylhexyl fumarate
Diethyl malonate
Methyl benzoate
Methyl decanoate
Methyl octanoate
Methyl palmitate
Methyl salicylate
Methyl methacrylate Polynuclear aromatics Naphthalene
2-Methylnaphthalene
1-Methylnaphthalene
Biphenyl
Fluorene
Anthracene
Acenaphthene
Tetrahydronaphthalene Alkyl benzenes Ethylbenzene
Cumene
p-Cymene Acids (acidified)

Octaonic
Decanoic
Palmitic
Oleic
Benzoic

Phenols

Phenol
o-Cresol
3,5-Xylenol
o-Chlorophenol
p-Chlorophenol
2,4,6-Trichlorophenol
1-Naphthol Ethers Hexyl
Benzyl
Anisole
2-Methoxynaphthalene
Phenyl Halogen compounds Benzyl chloride
Chlorobenzene
Iodobenzene
o-Dichlorobenzene
m-Dichlorobenzene
1,2,4,5-Tetrachlorobenzene
α-o-Dichlorotoluene
m-Chlorotoluene
2,4-Dichlorotoluene
1,2,4-Trichlorobenzene Nitrogene compounds Hexadecylamine
Nitrobenzene
Indole
o-Nitrotoluene
N-Methylaniline
Benzothiazole
Quinoline
Isoquinoline
Benzonitrile
Benzoxazole As noted above, the polymeric adsorbents are regenerated by dissolving off the adsorbate when the adsorbent bed has reached a predetermined point of saturation, normally referred to as the breakthrough point and defined as that point when the stream discharged from the bed contains a preset level of the adsorbate. As also previously noted, this removal of the adsorbate has previously been accomplished by using an organic liquid solvent, such as methanol or isopropanol, under ambient temperature and pressure, and has included a costly solvent recovery procedure.

According to the process of this invention, a supercritical fluid is used for adsorbent regeneration, a process which requires no phase changes of the solvent and hence requires minimum expenditure of energy. This process also provides the possibility of attaining efficient recovery of the adsorbate if this is desired.

It is a well-known phenomenon that when certain gases are subjected to a specified pressure and maintained above a certain temperature they reach a supercritical state. Broadly, this supercritical state as the term is used herein may be defined as the region of temperature and pressure above the critical temperature and critical pressure of the compound. Although the term "supercritical" is applied generally to all temperatures above the critical state, it will be used hereinafter to refer to a gas which is at a pressure above its critical pressure and at a temperature between about 1.01 and about 1.3 times critical temperature in ° K. In most cases, however, it will be preferably to use temperatures no greater than about 1.1 times critical temperature in ° K.

Supercritical fluids have for some time been recognized as solvents for a number of different types of materials, among which may be listed aliphatic and aromatic hydrocarbons; organometallics such as metal alkyls and alcoholates, silicones and boroalkyls; organic esters of inorganic acids such as sulfuric and phosphoric; and organosilicons. (See for example *Chem. Rev.* 44, 477–513 (1949); *Trans. Faraday Soc.* 49, 1401–1405 (1953), and *AIChE Journal* 1, 20–25 (1955)). Generally, gases of different chemical nature but with similar physical properties behave similarly as solvents in the supercritical state. (See for example, "The Principles of Gas Extraction" by P.F.M. Paul and W.S. Wise, Mills and Boon Ltd., London, 1971).

Supercritical fluids have been used to separate organic mixtures (U.S. Pat. No. 3,843,824, British Pat. Nos. 1,057,911, 1,111,422, 1,346,134 and 1,400,098, and French Pat. Nos. 1,512,060, and 1,512,061) and to extract volatiles from coal (U.S. Pat. No. 2,664,390 and U.S. Defensive Publication T 861,044) and oil from shale (U.S. Defensive Publication T861,027).

Among those gases which may be converted to supercritical fluids at temperatures and pressures commonly used industrially are hydrocarbons such as methane, ethane, propane, butane, pentane, hexane, ethylene, and propylene; halogenated hydrocarbons and other haloethanes and halomethanes; and inorganics such as carbon dioxide, ammonia, sulfur dioxide, nitrous oxide, hydrogen chloride and hydrogen sulfide. Suitable mixtures of these gases may also be used. In the process of this invention, carbon dioxide has been found to be particularly suitable for removing organic adsorbates from polymeric adsorbents. The critical temperature of carbon dioxide is 304.2° K (31.0° C) and critical pressure is 72.9 atmospheres. The temperatures of its most advantageous condition of use for the practice of this invention is between about 1.01 and 1.1 times the critical temperature or between about 308° K and 335° K (34° C and 62° C). This temperature range is not far above ambient temperatures. Moreover, carbon dioxide has several other advantages among which are the fact that it is nonpolluting to the atmosphere and that it is inexpensive.

The critical temperatures and pressures for some selected fluids are listed below in Table 2:

Table 2

| Fluid | Critical Properties for Selected Fluids | |
|---|---|---|
| | $T_c °K$ | $P_c$ Atm |
| $CO_2$ | 304.2 | 72.9 |
| $NH_3$ | 405.5 | 111.3 |
| $H_2O$ | 647.6 | 226.8 |
| Methanol | 513.7 | 78.9 |
| Ethanol | 516.6 | 63.0 |
| Isopropanol | 508.5 | 47.0 |
| Ethane | 305.6 | 48.3 |
| Nitrous oxide | 309.7 | 71.4 |
| n-Propane | 370.0 | 42.0 |
| n-Butane | 425.2 | 37.5 |
| n-Pentane | 469.8 | 33.3 |
| n-Hexane | 507.4 | 29.6 |
| n-Heptane | 540.2 | 27.0 |
| 2,3-Dimethylbutane | 500.0 | 31.0 |
| Benzene | 562.1 | 48.3 |
| Dichlorodifluoromethane | 384.9 | 39.4 |
| Dichlorofluoromethane | 451.7 | 51.0 |
| Trichlorofluoromethane | 469.8 | 41.7 |
| Dichlorotetralfluoroethane | 419.3 | 35.5 |
| Chlorotrifluoromethane | 302.0 | 39.0 |
| Ethylene | 282.9 | 50.9 |

In choosing a supercritical fluid for the regeneration of a polymeric adsorbent containing one or more organic species adsorbed thereon, the supercritical fluid must be a solvent for the species to be removed and it must be a fluid which does not react with the surface of the adsorbent.

Figure 1:
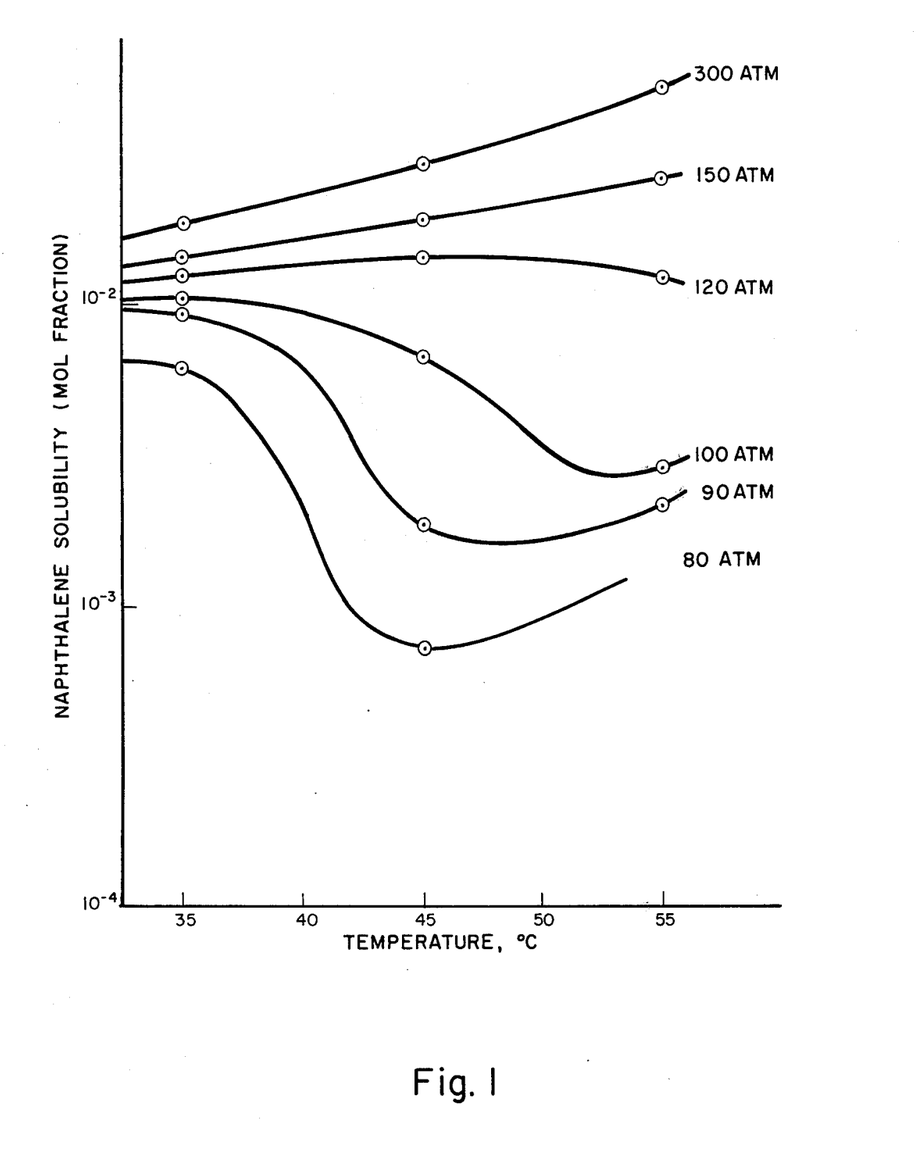
FIG. 1 is a graph of naphthalene solubility in carbon dioxide over a temperature range from 35° C to 55° C for selected pressures.

For any one adsorbate/supercritical fluid system, the physical changes to which the supercritical fluid must be subjected to render it first a solvent for the adsorbate and then a nonsolvent for it will, of course, depend upon the solubility of the adsorbate in the supercritical fluid under different temperatures and pressures. Exemplary of such a system is naphthalene/supercritical carbon dioxide. FIG. 1 is a graph of naphthalene solubility in carbon dioxide over a temperature range from 35° C to 55° C for selected pressures (taken from Yu. V. Tsekhanskaya, M.B. Iomtev and E.V. Mushkina, Zh. Fiz. Khim., 38, 2166 (1964)). This graph of FIG. 1 shows that dissolved organic compounds, such as naphthalene, can be separated from the supercritical carbon dioxide solvent by either: (a) temperature-cycling at constant pressure (e.g., at 300 atmospheres, absorbing at 55° C and precipitating at 35° C; or at 80 atmospheres absorbing at 35° C and precipitating at 45° C); (b) pressure-cycling at constant temperature (e.g., at 55° C, absorbing at 300 atmospheres and precipitating at 80 atmospheres); or (c) a combination of temperature/pressure cycling.

Figure 2:
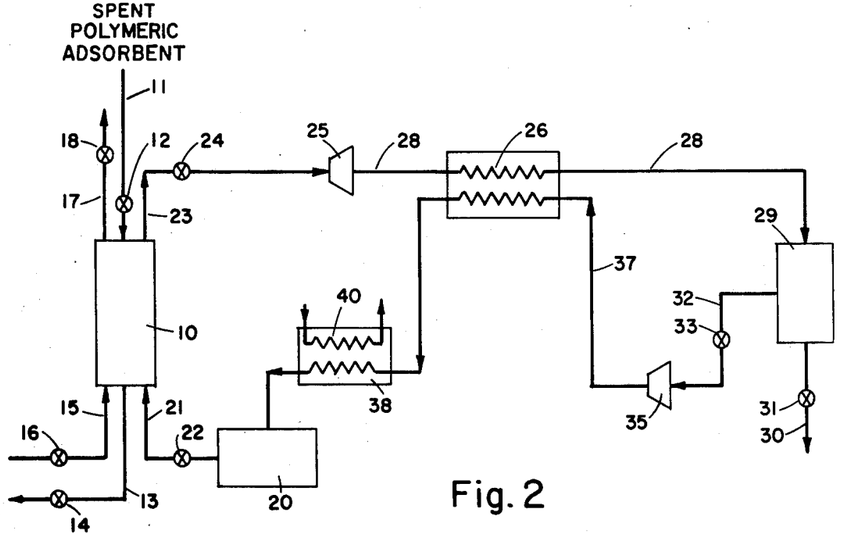
FIG. 2 is a flow diagram illustrating one embodiment of the process and apparatus for regenerating adsorbents according to this invention.

The method and apparatus of this invention are illustrated in somewhat diagrammatic form in FIG. 2 using carbon dioxide as the supercritical fluid to remove hydrogen impurities adsorbed on a polymeric adsorbent. In the apparatus of FIG. 2 it will be assumed that spent polymeric adsorbent in the form of a transportable finely divided particulate material is derived from an adsorbent storage tank (see FIG. 5) and introduced at essentially ambient temperature and pressure into desorption column 10 (serving as fluid contacting means) by way of line 11, the in-flow of spent polymeric adsorbent being controlled by high-pressure on-off valve 12. The desorption column 10 must be constructed to be able to withstand the highest pressure to which the supercritical fluid is raised. Thus, for example, desorption column 10 may be any suitably designed pressure vessel. Although the process shown in FIG. 2 is a batch process, it is, of course, within the scope of this invention to use a continuous process if desired. In such a batch process as this the spent polymeric adsorbent is charged to desorption column 10 in batches, followed by pressurization and then desorption by the circulation of supercritical fluid therethrough.

Desorption column 10 also has a regenerated adsorbent discharge line 13 with high-pressure valve 14; and a gas purge inlet line 15 with high-pressure valve 16 and gas purge discharge line 17 with high-pressure valve 18.

The supercritical fluid for regeneration, e.g., carbon dioxide at 300 atmospheres pressure and 35° C is stored in a storage tank 20 and is periodically introduced into desorption column 10 through high-pressure line 21 having a high-pressure fluid flow control valve 22. Subsequent to its contacting the polymeric adsorbent in column 10, the supercritical fluid having adsorbate, e.g., organic materials, dissolved therein is withdrawn from column 10 through high-pressure line 23, the fluid flow through which is controlled by high-pressure on-off valve 24.

In the embodiment of this invention illustrated in FIG. 2 the physical treatment to which the supercritical fluid is subjected to render it a nonsolvent for the adsorbates is that of decreasing its pressure. This is done by expanding the supercritical fluid in a suitable expander, e.g., a turbo expander 25 or a pressure let-down valve. In this example using carbon dioxide at 300 atmospheres and 35° C, such expansion will typically reduce the pressure to about 80 atmospheres. Such expansion may reduce the temperature as in the case of the example illustrated in FIG. 2. In any event, it may be necessary to adjust the temperature of the fluid so that it has minimum solubility for the adsorbates prior to recycling it. Thus FIG. 2 illustrates heat exchangers 26 and 38 in the fluid lines for effecting temperature adjustment.

The decrease in pressure experienced by the supercritical fluid brought about through expansion in expander 25 and any variation in temperature brought about in heat exchanger 26 renders the supercritical fluid a nonsolvent for the adsorbate. Thus the adsorbate appears as a separate phase and there results a two-phase fluid which is taken to phase separator 29. This separator may be, for example, a cyclone separator or a holding tank. The adsorbate is withdrawn from phase separator 29 through adsorbate drawoff line 30 having valve 31 and the supercritical fluid is discharged from the separator 29 through discharge line 32 and valve 33. In the case of this particular example of carbon dioxide, the temperature of the carbon dioxide is raised to about 35° C in heat exchanger 26. However, since the pressure is only about 80 atmospheres, it is necessary to compress it to return it to that condition under which it is a solvent for the adsorbate. This is done by compressing it in a compressor 35 which brings it back up to 300 atmospheres pressure and about 95° C. Since this temperature is considerably above the desired 35° C for supercritical carbon dioxide in this example, the supercritical fluid is used in heat exchanger 26 to heat the fluid discharge from expander 25. Thus the one side of heat exchanger 26 is part of supercritical flow line 37 connecting compressor 35 with storage tank 20. In this example using carbon dioxide, the temperature of the supercritical fluid as it leaves heat exchanger 26 may still be above the desired 35° C so that a second heat exchanger 38 is provided to effect heat exchange between the supercritical fluid and an externally-supplied coolant, e.g., water, flowing in coils 40. Thus the supercritical fluid reaches storage tank 20 in a solvent condition to be recycled.

Although the supercritical fluid may be used as a solvent for the adsorbates at temperatures and pressures above its supercritical temperature and pressure, it is generally preferable to maintain its temperature no greater than about 1.1 times the critical temperature in ° K of the fluid and even more preferable in some cases to maintain its temperature during solvation no greater than about 10° K above the critical temperature. The maximum pressure will be determined by the high-pressure capabilities of the equipment used. Generally, the higher pressures will be preferable to enhance the solubility of the adsorbate. In choosing the physical conditions to render the supercritical fluid a nonsolvent for the adsorbate it will generally be desirable to alter the pressure and/or temperature of the supercritical fluid no more than is necessary to separate out the adsorbate.

Figure 3:
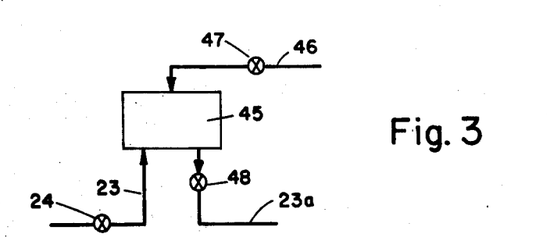
FIG. 3 illustrates in diagrammatic fashion a modification of the process and apparatus of FIG. 2 to include the reaction of the adsorbate with a chemical reactant while dissolved in the supercritical fluid.

It may be desirable in some cases to alter the chemical nature, and hence physical properties, of the absorbate subsequent to its removal from the adsorbent. This may be done by reacting the adsorbate with a suitable reactant while it is dissolved in or mixed with the supercritical fluid. Thus in FIG. 3, in which the same reference numerals are used to identify the same components of FIG. 2, there is shown a reaction chamber 45 into which a reactant for the adsorbate (e.g., oxygen to react with organic materials) is introduced through line 46 and valve 47. The supercritical fluid is then withdrawn through line 23a, which is an extension of line 23, and valve 48. If, as shown in FIG. 3, the reactant is introduced into the supercritical fluid while it is in its solvent state, then reaction chamber 45 and all the lines and valves in them must be capable of handling high pressures. Alternatively, the reaction chamber may be associated with line 28 in the same manner as shown in FIG. 3 for line 23 such that the reaction may be carried out in the two-phase system wherein the supercritical fluid is in its nonsolvent state. Any reactant used for the adsorbate must, of course, not be a reactant for the supercritical fluid in its state in which the reactant is introduced.

Figure 4:
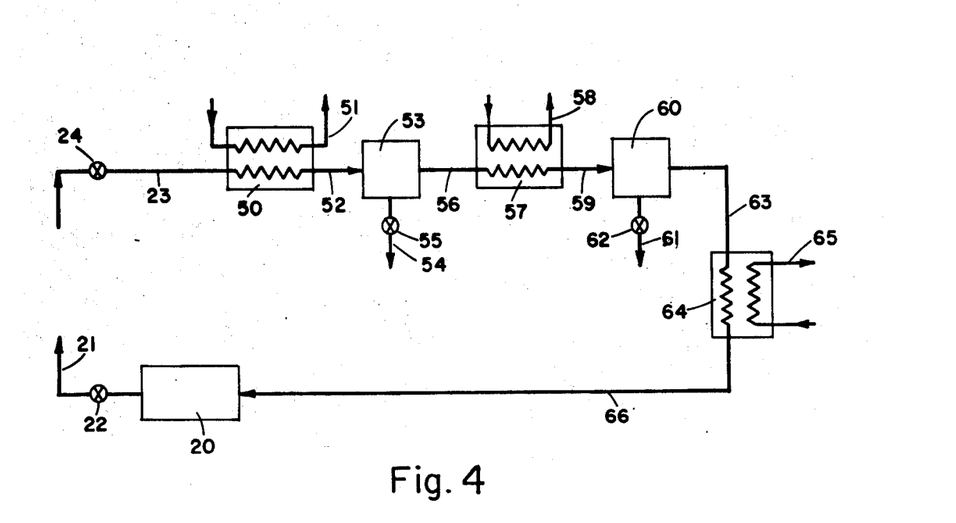
FIG. 4 is a flow diagram illustrating another embodiment of the process and apparatus of this invention.

FIG. 4 illustrates another embodiment of the process and apparatus for treating the supercritical fluid to render it a nonsolvent for the adsorbate and then to reconvert it as a solvent for recycling. In the embodiment of FIG. 4 these treating steps are limited to changing the temperature of the supercritical fluid to effect phase separations and it is assumed for the sake of illustration that the adsorbate constitutes at least two distinct chemical species which exhibit different solubilities in the supercritical fluid. In FIG. 4 like reference numerals refer to like components in FIG. 2.

The apparatus of FIG. 4 provides for a multiple-step separation brought about through two successive increases (or decreases) in temperature. Although two steps are illustrated, any suitable number may be employed. Thus the supercritical fluid containing all of the adsorbate dissolved therein is carried through line 23 into a first heat exchanger 50 where it is heated (or cooled) through indirect heat exchange with an externally-supplied heat transfer fluid in line 51 to a first higher (or lower) temperature which is sufficient to separate out a first fraction of the adsorbate. Thus, in effect, the supercritical fluid is converted to a nonsolvent state for this first fraction of adsorbate but remains in a solvent state for any succeeding fractions of the adsorbate. Through line 52 this first two-phase liquid is taken to a first phase separator 53 from which the first adsorbate fraction is discharged through line 54 and valve 55. Then the supercritical fluid containing the second adsorbate fraction dissolved therein is directed through line 56 into a second heat exchanger 57 where it is heated (or cooled) further by an externally-supplied heat transfer fluid in line 58. This heating separates out the second adsorbate fraction and the resulting two-phase fluid is carried by line 59 into a second phase separator 60 from which the second adsorbate fraction is discharged through line 61 and valve 62. The high-temperature supercritical fluid is taken by line 63 to a heat exchanger where it is cooled (or heated) by indirect heat exchange with a coolant (or heating fluid) externally supplied through line 65. The supercritical fluid at the desired temperature and pressure (i.e., in the solvent state for all adsorbates) is then transferred through line 66 to storage tank 20.

The use of temperature alone to render the supercritical fluid a nonsolvent for the adsorbate requires that high-pressure equipment be used throughout. Thus the embodiment of FIG. 4 is more desirable in those cases where supercritical pressures are relatively low and where the solubility of the adsorbate is relatively sensitive to temperature.

It is, of course, within the scope of this invention to eliminate the second heat transfer step shown in FIG. 4 and perform only one separation step through changing the temperature. It is also within the scope of this invention to carry out the depressurizing of the supercritical fluid as shown in FIG. 2 in more than one stage, thus effecting the separation of more than one adsorbate. It is also within the scope of this invention to incorporate a reaction step as illustrated in FIG. 3 into the process of FIG. 4.

Figure 5:
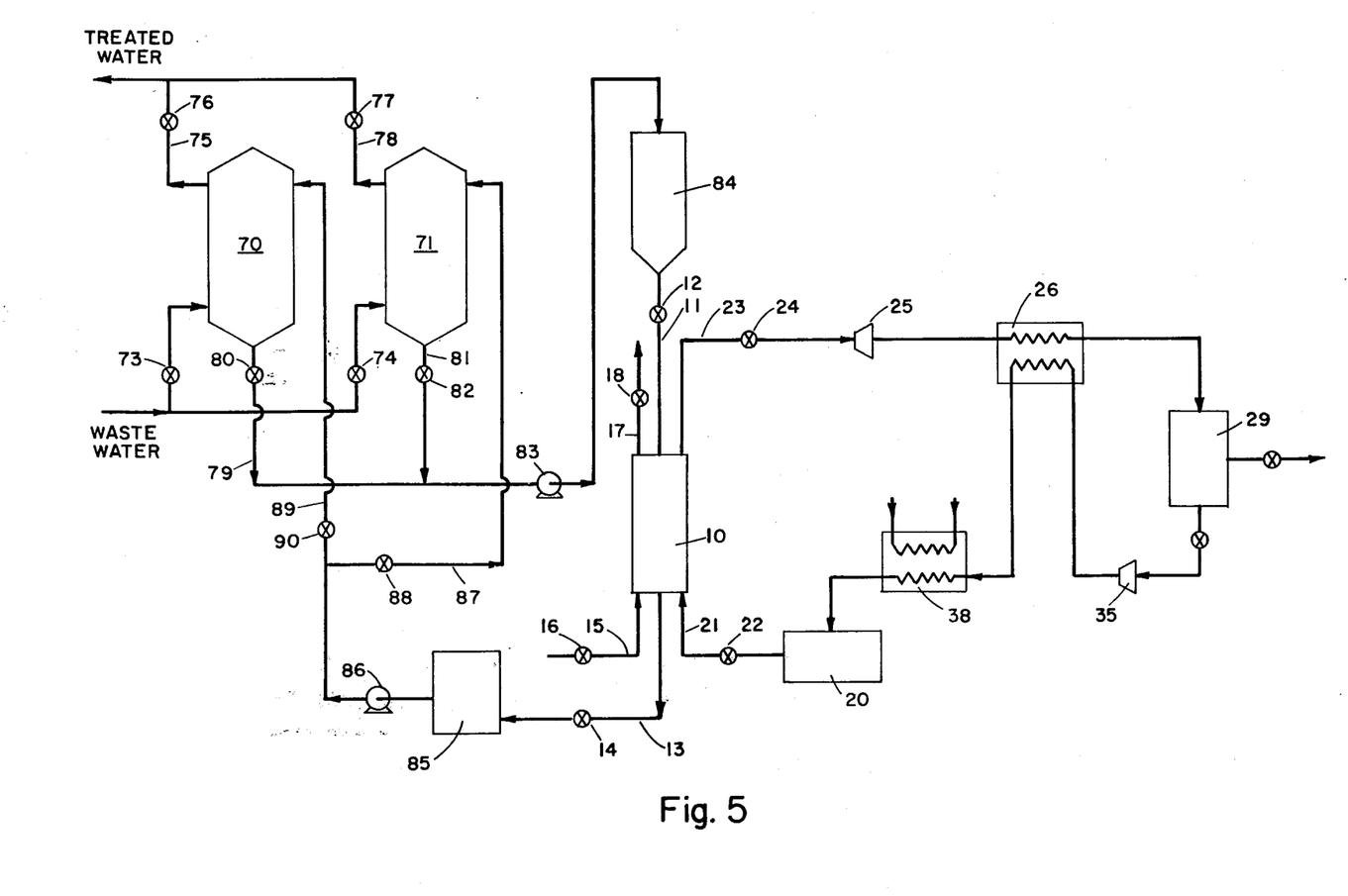
FIG. 5 is a flow diagram of a wastewater treatment system incorporating the process and apparatus of this invention for regenerating a polymeric adsorbent used therein.

The incorporation of the adsorbent regeneration process of this invention into a wastewater purification system such as one of these detailed above and using a polymeric adsorbent is illustrated diagrammatically in FIG. 5. The apparatus of FIG. 2 is employed; and since like reference numerals have been used to describe like components the description of the circulation of the supercritical fluid need not be repeated.

FIG. 5 illustrates the use of two alternating adsorption columns 70 and 71 which are cycled so that while one is in use the other may be regenerated. This is, of course, a well-known arrangement and any suitable number of adsorbent columns may be used in parallel as well as in series. The wastewater to be purified is introduced through line 72 into column 70 or 71, depending upon whether valve 73 or 74 is open. Assume that column 70 is on stream, valve 73 will be open and valve 74 closed. Column 70 is packed with the appropriate polymeric adsorbent to adsorb impurities and the treated water is discharged through line 75 and valve 76. Since column 71 is off stream and is being readied for use, valve 77 in water discharge line 78 is closed. Under these conditions, spent polymeric adsorbent line 79 and its associated valve 80 of column 70 are closed; while spent polymeric adsorbent line 81 and its associated valve 82 of column 71 are open to enable pump 83 to transfer spent adsorbent with its adsorbate adhered to its surface to the spent adsorbent drain and feed tank 84 from where it is introduced periodically into contacting column 10 for regeneration as described above in conjunction with the discussion of FIG. 2. Slurry pumps or water eductors to function as pump 83 are well known.

Normally the polymeric adsorbent will not be dried prior to desorption since water can be removed by the solvent supercritical carbon dioxide and subsequently separated from it by appropriate variations in temperature and/or pressure. However, it may be desirable in some cases to remove residual water from the adsorbent prior to regeneration with supercritical fluid. If so, prior to the extraction of adsorbate from the adsorbent in contacting column 10, valves 22 and 24 are closed and valves 16 and 18 are opened to permit a drying gas, e.g., hot air, to pass over the spent adsorbent to remove residual water. Then carbon dioxide at atmospheric pressure is passed up through the dried spent adsorbent to remove any air remaining in the pores of the spent adsorbent. Valves 16 and 18 are then closed and valves 22 and 24 are opened; and regeneration is effected as previously described. Then with valves 12, 22, 23, 16 and 18 closed, valve 14 is opened and the regenerated polymeric adsorbent is transferred by line 13 into adsorbent storage tank 85 from which it may be transferred by pump 86 into the off-stream column 71. Thus the regenerated adsorbent is taken through line 87, controlled by valve 88, into column 71; and when column 70 is off stream the regenerated adsorbent is introduced into it through line 89, controlled by valve 90.

Figure 6:
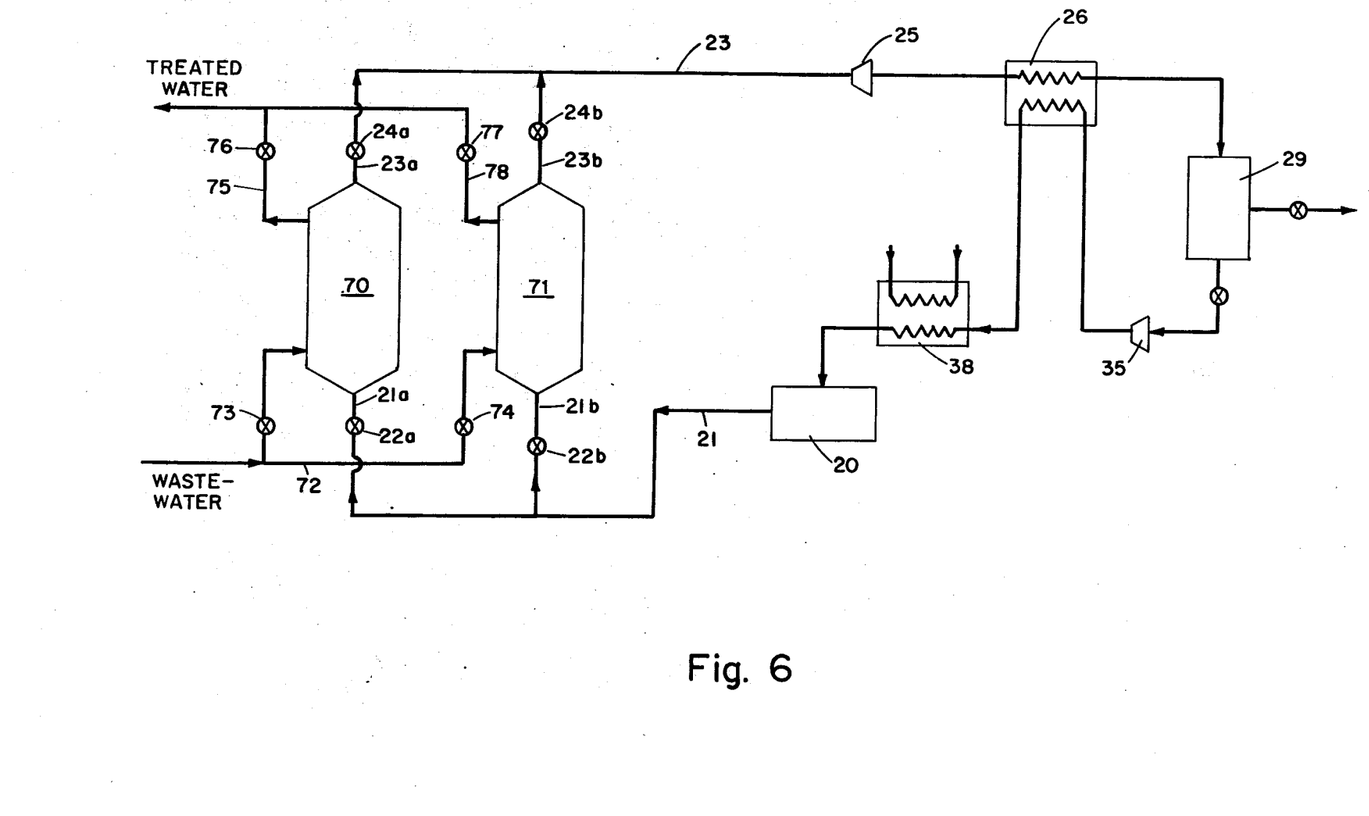
FIG. 6 is a modification of the apparatus of FIG. 5.

FIG. 6 illustrates a modification of the apparatus shown in FIG. 5. In the arrangement of FIG. 6, separate desorption column 10, along with the conduit means for transferring spent adsorbent into and withdrawing regenerated adsorbent therefrom is eliminated. Instead, desorption is accomplished directly in columns 70 and 71, in which case these columns are vessels capable of withstanding the pressure required to maintain the supercritical fluid supplied from storage tank 20 in its solvent state. Fluid conduit 23, through which the supercritical fluid containing the adsorbate is alternately withdrawn from columns 70 and 71, is branched into conduits 23a and 23b having valves 24a and 24b, respectively. Likewise, fluid conduit 21, through which supercritical fluid is supplied alternately to columns 70 and 71, is branched into conduits 21a and 21b having valves 22a and 22b, respectively.

The process of this invention may be further described with reference to the schematic of FIG. 5, using phenol and 2,4,-6-trichlorophenol as the adsorbates, a polymeric resin as the adsorbent and supercritical carbon dioxide as the solvent. Exemplary of such a resin is a polystyrene characterized as having a porosity volume of 51%, a true wet density of 1.02 grams/cc, a surface area of 780m$^2$/gram, an average pore diameter of 50A, a skeletal density of 1.08 grams/cc and a nominal mesh size of 20 to 50. At a water flow rate of 0.5 gallons per minute per cubic foot this polymeric adsorbent adsorbs about 0.78 pounds per cubic foot of phenol with zero percent leakage from a concentration of 250 ppm in the water feed. This adsorbent also adsorbs up 12 pounds per cubic foot of trichlorophenol with zero percent leakage at the same flow rate. Regeneration of the adsorbent can be carried out by using supercritical carbon dioxide under the conditions described above in connection with the discussion of FIG. 2 when the breakthrough point in adsorption is detected. The supercritical carbon dioxide can be used at 35° C and 300 atmospheres to dissolve the phenol and trichlorophenol from the polymeric adsorbent and it can then be converted to the nonsolvent state for the adsorbates by reducing the pressure to 80 atmospheres and/or increasing the temperature to 45° C. The presence of phenol in the carbon dioxide may be detected through ultraviolet detection means. The resulting reactivated adsorbent can then again be contacted with additional aqueous phenol/trichorophenol solution.

By using a supercritical fluid to dissolve off the adsorbates from a polymeric adsorbent, the adsorbent is not subjected to any appreciable thermal or chemical degradation and the adsorbed species may be recovered if desired. Moreover, it is possible to use such supercritical fluids as carbon dioxide, ethane or ethylene which require temperatures and pressures well within the capabilities of existing equipment. Finally, these fluids (and particularly carbon dioxide) are inexpensive, a fact which contributes materially to the economics of industrial processes and wastewater purification.

Organic impurities in wastewater in trace amounts may be detected and amounts as low as parts per billion may be measured. Subsequent to the removal of the impurities from a water stream by adsorption on a polymeric adsorbent they are dissolved in a supercritical fluid in accordance with the process of this invention. Since complete separation of the adsorbate impurities from the supercritical fluid is readily accomplished without effecting any chemical or physical change in the adsorbate, well-known analytical techniques may then be employed to determine precisely the amounts of the impurities in a given sample.

It will thus be seen that the objects set forth above, among those made apparent from the preceding description, are efficiently attained and, since certain changes may be made in carrying out the above process without departing from the scope of the invention, it is intended that all matter contained in the above description or shown in the accompanying drawings shall be interpreted as illustrative and not in a limiting sense.

I claim:

1. A process for treating water to remove at least one organic material therefrom, comprising the steps of
   a. contacting a synthetic organic polymeric adsorbent with a stream of water containing said organic material under conditions such that said organic material is adsorbed as an adsorbate on said synthetic organic polymeric adsorbent;
   b. then contacting said synthetic organic polymeric adsorbent with said organic material adsorbed thereon with a supercritical fluid which is a solvent for said organic material to desorb said organic material and to dissolve it in said supercritical fluid, thereby to render said adsorbent capable of adsorbing an additional quantity of said organic material, said supercritical fluid during said contacting being at a temperature between about 1.01 and about 1.3 times its critical temperature in degrees K and at a pressure above its critical pressure;
   c. separating said supercritical fluid with said dissolved organic material from said adsorbent;
   d. subjecting said supercritical fluid containing said organic material dissolved therein to physical treatment which renders said fluid a nonsolvent for said organic material thereby to form a two-phase system comprising said fluid in a nonsolvent state and said organic material;
   e. separating the resulting two-phase system into nonsolvent state fluid and organic material; and
   f. subjecting said nonsolvent state fluid subsequent to said separating step to a physical treatment which converts it to a solvent state supercritical fluid making it a solvent for said organic material.

2. A process in accordance with claim 1 wherein said synthetic organic polymeric adsorbent is a polymer of styrene, a copolymer of styrene and divinylbenzene, or a polymer containing an acrylic ester, trimethylolpropane trimethacrylate or trimethylolpropane dimethacrylate.

3. A process in accordance with claim 1 wherein said supercritical fluid is carbon dioxide.

4. A process in accordance with claim 1 wherein said supercritical fluid used in step (b) is at a temperature between about 1.01 and 1.1 times the critical temperature in degrees K of said fluid.

5. A process in accordance with claim 1 wherein said supercritical fluid is carbon dioxide at a temperature between about 34° C and 65° C.

6. A process in accordance with claim 1 wherein said physical treatment of step (d) comprises decreasing the pressure of said supercritical fluid.

7. A process in accordance with claim 6 wherein said physical treatment of step (f) comprises compressing said nonsolvent state fluid to a pressure which is greater than said critical pressure.

8. A process in accordance with claim 6 wherein said decreasing of said pressure is accomplished by expansion accompanied by a concomitant decreasing of the temperature of said supercritical fluid.

9. A process in accordance with claim 8 wherein said physical treatment of step (f) comprises compressing said nonsolvent state fluid thereby to heat said fluid and to raise it to a pressure which is greater than said critical pressure and effecting indirect heat exchange between said nonsolvent state fluid and the resulting compressed fluid thereby to decrease the temperature of said compressed fluid and to form said solvent state supercritical fluid.

10. A process in accordance with claim 1 wherein said physical treatment of step (d) comprises changing the temperature of said supercritical fluid in one direction and said physical treatment of step (f) comprises changing the temperature of said nonsolvent state fluid in a direction opposite to that of step (d).

11. A process in accordance with claim 1 wherein the physical treatment of step (d) and the separating of step (e) are carried out in stages thereby to effect the separation of more than one fraction of said adsorbate.

12. A process in accordance with claim 1 including the step of chemically reacting said adsorbate in said supercritical fluid with a reactant for said adsorbate introduced therein.

13. A process in accordance with claim 12 wherein said step of chemically reacting said adsorbate is carried out prior to said physical treatment of step (d).

14. A process in accordance with claim 12 wherein said step of chemically reacting said adsorbate is carried out subsequent to said physical treatment of step (d).

15. A process in accordance with claim 1 wherein said water comprises the bleaching effluent from a pulp mill and said organic material comprises color bodies.

16. A process in accordance with claim 1 wherein said water comprises a stream containing waste dyestuffs as said organic material.

17. A process in accordance with claim 1 wherein said water is a wastewater stream containing pesticides, insecticides, detergents or explosives as said organic material.

18. A process in accordance with claim 1 wherein said water contains a biological material as said organic material.

19. A process for desorbing an adsorbate from a synthetic organic polymeric adsorbent, characterized by contacting said synthetic organic polymeric adsorbent with said adsorbate adsorbed thereon with a supercritical fluid which is a solvent for said adsorbate to desorb said adsorbate from said synthetic organic polymeric adsorbent and to dissolve it in said supercritical fluid thereby to render said adsorbent capable of adsorbing an additional quantity of said adsorbate; the temperature of said supercritical fluid ranging between about 1.01 and 1.3 times the critical temperature in degrees K of said fluid and the pressure being above the critical pressure of said fluid.

20. A process in accordance with claim 19 wherein said supercritical fluid is carbon dioxide.

21. A process in accordance with claim 19 wherein said supercritical fluid ranges between about 1.01 and 1.1 times the critical temperature in degrees K of said fluid.

22. A process in accordance with claim 21 wherein said supercritical fluid is carbon dioxide.

23. In a process for treating wastewater in which at least one organic material is adsorbed on a synthetic organic polymeric adsorbent and said synthetic organic polymeric adsorbent is periodically regenerated by desorbing said organic material therefrom, the improvement comprising regenerating said synthetic organic polymeric adsorbent by contacting said adsorbent with said organic material with a supercritical fluid which is a solvent for said organic material to desorb said organic material from said adsorbent and to dissolve it in said supercritical fluid thereby to render said adsorbent capable of adsorbing an additional quantity of said organic material; the temperature of said supercritical fluid ranging between about 1.01 and 1.3 times the critical temperature in degrees K of said fluid and the pressure being above the critical pressure of said fluid.

24. A process in accordance with claim 23 wherein said supercritical fluid is carbon dioxide.

* * * * *